(12) United States Patent
Green et al.

(10) Patent No.: US 8,057,895 B2
(45) Date of Patent: Nov. 15, 2011

(54) POLYETHYLENE PIPE PATCHING SYSTEMS AND METHODS

(75) Inventors: Kenneth H. Green, Whitefish, MT (US); Kenneth D. Cramer, Corvallis, OR (US); Willie E. Rochefort, Corvallis, OR (US)

(73) Assignee: Timberwolf Corporation, Whitefish, MT (US)

( * ) Notice: Subject to any disclaimer, the term of this patent is extended or adjusted under 35 U.S.C. 154(b) by 689 days.

(21) Appl. No.: 11/829,374

(22) Filed: Jul. 27, 2007

(65) Prior Publication Data

US 2008/0026214 A1   Jan. 31, 2008

Related U.S. Application Data

(63) Continuation of application No. PCT/US2006/003387, filed on Jan. 31, 2006.

(60) Provisional application No. 60/648,573, filed on Jan. 31, 2005.

(51) Int. Cl.
*B32B 7/12* (2006.01)
*B32B 15/04* (2006.01)

(52) U.S. Cl. ........ 428/343; 428/346; 428/347; 428/352; 428/354; 428/355 R

(58) Field of Classification Search ............... 428/343, 428/346, 347, 352, 354, 355 R
See application file for complete search history.

(56) References Cited

U.S. PATENT DOCUMENTS

| | | | |
|---|---|---|---|
| 2,681,877 A | | 6/1954 | Seymour |
| 3,143,364 A | * | 8/1964 | Klein ............................. 285/55 |
| 3,865,662 A | * | 2/1975 | Segal ............................. 156/94 |
| 4,511,621 A | | 4/1985 | Thomas et al. |
| 4,582,292 A | | 4/1986 | Glotzback et al. |
| 5,358,994 A | | 10/1994 | Mallow |
| 5,732,743 A | | 3/1998 | Livesay |
| 6,553,838 B2 | | 4/2003 | Amini |
| 6,586,483 B2 | | 7/2003 | Kolb et al. |
| 6,750,448 B2 | | 6/2004 | Turecek et al. |
| 6,777,080 B2 | | 8/2004 | Khandpur et al. |
| 7,337,648 B2 | | 3/2008 | Green |
| 2006/0118191 A1 | * | 6/2006 | Rice ............................. 138/99 |
| 2007/0014984 A1 | | 1/2007 | Stout et al. |

FOREIGN PATENT DOCUMENTS

| | | |
|---|---|---|
| DE | 33 35 728 A1 | 4/1985 |
| EP | 0 532 391 A | 3/1993 |
| FR | 2 231 916 A | 12/1974 |
| FR | 2 728 494 | 6/1996 |

* cited by examiner

*Primary Examiner* — Victor Chang
(74) *Attorney, Agent, or Firm* — Dorsey & Whitney LLP; David E. Bruhn, Esq.

(57) ABSTRACT

Film composites useful as adhesives for plastic piping are described.

6 Claims, 3 Drawing Sheets

POLYETHYLENE PIPE PATCHING SYSTEMS AND METHODS

CROSS REFERENCE TO RELATED APPLICATIONS

This application is a continuation of International Application No. PCT/US2006/003387, filed on Jan. 31, 2006, which claims priority to U.S. Application No. 60/648,573, filed on Jan. 31, 2005, both of which are incorporated herein by reference.

BACKGROUND

Various circumstances require repair of plastic, i.e., polyethylene piping. Repair or connection can be affected by applying an adhesive or composite directly to the crack in the pipe. Alternatively, a multipart sleeve can be placed over the defect or pipe connection and sealed about it. Still another alternative when a pipe is damaged is to cut out the damaged area and replace it with a new section of piping. Yet another alternative is to "spot weld" the plastic piping together as is known in the art.

The afore-mentioned methods have some disadvantages. For example, application of an adhesive or composite to a crack tends to not provide a uniform seal. Also, the application may involve a "cure" time in which pressure exerted within the pipe may force the material out of the crack.

With regard to application of a multipart sleeve to the damaged area, this may often involve significant labor to excavate the area about the pipe so that the sleeve can be placed around the damaged area.

Cutting of the pipe to undertake repairs is often not desirable, especially when the pipe contains a liquid, such as oil or water, or a flammable gas. The operator would need to shut off the liquid or gas and purge the pipe to avoid contamination of the liquid or risk a gas explosion. This is generally not acceptable for most applications. Additionally, as mentioned above, excavation about the section to be replaced would be required. This can prove to be quite costly, both in terms of time as well as other financial resources.

Welding, including spot welding, can also be problematic. If the pipe contains or contained a flammable substance, the arc, spark, open flame and/or relatively high temperatures typically involved in welding could ignite the material. Again, excavation about a large area might be required to access the repair site and can be costly.

Thus, there exists a need to provide an improved system and method to repair plastic piping.

SUMMARY

The present invention provides new composites and new methods to use these composites to repair and/or connect pieces of plastic piping, holding tanks, bulkhead, plastic vessels and the like, that overcome one or more of the disadvantages that are current in the art.

In one embodiment, the present invention provides a multi-layer patch (MLP) that includes at least a first and second layer. The first layer is a polymer adhesive; this includes gels formed from dissolved polymers or solvent swollen polymer films. The second layer is a support film, or backing layer, that becomes intimately incorporated with the first polymer adhesive layer upon application of heat.

In some embodiments, the present invention provides a composite comprising three or, optionally, four layers when an envelope packaging configuration is desired. One layer, for example the bottom, outermost layer in contact with the pipe to be repaired, can be comprised of a suitable film that is intimately incorporated into the polymer adhesive layer, and ultimately into the bond after curing. Another layer, for example the top, outermost layer can comprise a suitable material (e.g., a film) that when combined with the bottom, outermost layer forms a protective envelope for the patch assembly.

In some embodiments, both the top, outermost and bottom, outermost layers become incorporated into the polymer adhesive layer during curing, and ultimately become part of the bond. In some embodiments, only the bottom layer becomes incorporated into the polymer adhesive layer; the top layer is of a material or a thickness such that it is not completely incorporated into the polymer adhesive layer, but actually results in a bonded substrate after the curing process. In some embodiments, the top layer can be a reinforced plastic. The reinforcing material included in the top layer can, for example, be an ultrahigh molecular weight polyethylene, such as Spectra®, a nylon, or a polyaramide fiber, such as Kevlar®, or any other appropriate reinforcing material. In some embodiments, the polymer adhesive layer could include suitable reinforcing materials; these materials could be randomly arranged individual fibers, a layer of continuous fibers (i.e., a sheet), a fiber mesh, or they could comprise a distinct layer of either continuous fibers or a woven or non-woven fiber, or metal wires or mesh.

Generally, the polymer adhesive layer is a combination of a polyethylene, a polyamide, a polyester, a polybutylene, a polyvinyl chloride (PVC) or a poly(acrylonitrile, butadiene, styrene) (ABS) and a solvent. Various molecular weights of the polymer adhesives are contemplated within the scope of the invention. Suitable solvents include those that will dissolve a portion of the polymer such that the polymer is present in the gel from between about 2 to about 60% by weight. Other suitable solvents include those that will swell the polymer such that the polymer is present in the swollen film from between about 15 to about 60% by weight Generally, the second support film layer is a polyethylene, a polyamide, a polyester, a polybutylene, a PVC or an ABS. Various molecular weights of the support film polymer layer are contemplated within the scope of the invention.

The MLP can further include a third layer that acts as a barrier or release film, which is in contact with the polymer adhesive layer. In one aspect the third layer is of a type that can be intimately incorporated into the first polymer adhesive layer upon application of heat. Suitable films include polyethylenes, polyamides, polyesters, polybutylenes, PVCs and ABSs. Various molecular weights of the polymers of the film are contemplated within the scope of the invention. In another aspect the third layer is a release material and can be a film, a coating or a powder.

The MLP of the invention can be applied to plastic piping in order to facilitate connection of ends or the repair of breaks, holes, cracks, fissures, etc. in the piping.

The MLP of the invention provide certain advantages over current repair/adhesive techniques for plastic piping. For example, a uniform seal is achieved with the composites of the invention. The materials have enough integrity that they do not seep into the crack, for example, and lose strength over time.

DETAILED DESCRIPTION

The present invention provides new MLPs and methods to use the new MLPs to connect, repair or reinforce plastic piping that overcome one or more of the disadvantages that are current in the art.

Figure 1:
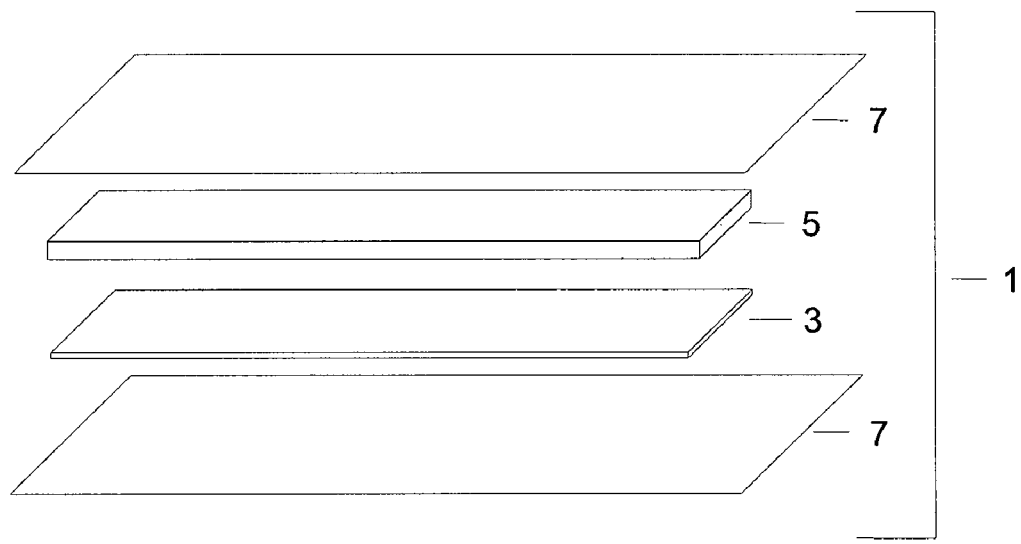
FIGS. 1, 1A, and 1B depict one aspect of a MLP of the invention with and without the optional release or envelope barrier films.
Figure 1A:
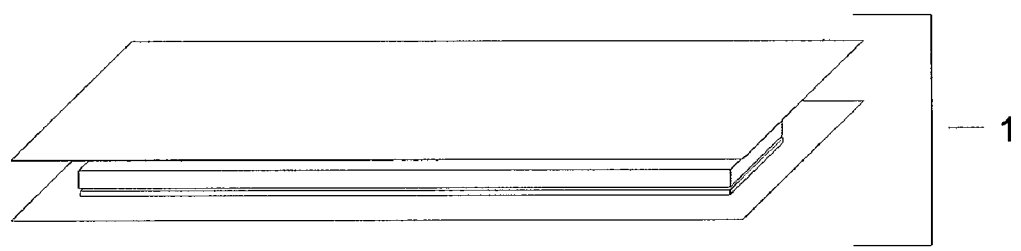
Figure 1B:

FIGS. 1, 1A, and 1B depict one aspect of the present invention providing a MLP 1 that includes at least a first 3 and second layer 5 with the optional third and/or fourth layers 7. The first layer 3 is a polymer adhesive layer. The second layer 5 is a support film or thicker substrate (backing layer) whose surface becomes intimately incorporated with the first polymer adhesive layer upon application of heat. The optional third and/or fourth layer(s) 7 can either be release films or envelope barrier films.

The phrase "intimately incorporated" is intended to mean that upon physical exertion, such as heating of the first layer 3 and second layer 5 against a pipe (not shown) that the solvent remaining in the first polymer adhesive layer 3 will cause the support film 5 to become homogeneously or heterogeneously incorporated with the other layer(s). Not to be limited by theory, the stressing of the two layers effectively causes the two layers to become a single layer. Typical temperatures used to accomplish this are about 20 to 30° C. below the softening or melting point of the plastic. For example, the ultra high molecular weight polyethylene polymer adhesive based MLP 1 is heated to about 100 to about 130° C. when connecting or repairing polyethylene piping. In some embodiments, the polymer adhesive layer and/or film layers are incorporated into a bond layer (along with the pipe surface) when the adhesion process is complete.

Generally, the polymer adhesive layer 3 is a combination of a polyethylene, a polyamide, a polyester, a polybutylene, a PVC or an ABS and a solvent. Various molecular weights of the polymer adhesive layer are contemplated within the scope of the invention. Additionally, the polymer can have low, medium or high density, such as a low density (LDPE), medium density (MDPE), high density (HDPE), or ultrahigh molecular weight polyethylene (UHMWPE).

Suitable solvents include those that will dissolve a weight percentage of the polymer such that the polymer is present in the polymer adhesive layer 3 from between about 2 and about 60% by weight. For example, useful solvents to partially dissolve or swell polyethylene include decalin, tetralin, tetrachloroethylene, tetrachloroethane, xylene, and similar solvents.

In the gel formation process, a predetermined amount of polymer (powder, prills, pellets, etc.) is typically placed into the solvent and heated for about 30 minutes to 12 hours with some form of agitation. In the case of polyethylene, the solution is heated between about 100° C. to about 145° C. for up to a few hours. The resulting solution is cooled and becomes a gel. Before or during the cooling process, the viscous solution is poured onto a non-stick surface and pressed flat so that a gel forms that is between about 0.5 and about 6 mm thick.

In another embodiment a swollen polymer film can be used for layer 3. A piece of polymer film is cut to the desired size (the film swells approximately 40-60% in each direction). In the case of polyethylene, the polyethylene can be low (LDPE), medium (MDPE), high density (HDPE) or ultrahigh molecular weight (UHMWPE). The polymer film is placed in a hot solvent bath at from about 95 to about 115° C. and allowed to swell for the desired time (to achieve a 15-60 weight percent (wt %) swollen polymer film). The swollen film is then removed, chilled, and stored for later use.

Generally, the support film layer 5 is a polyethylene, a polyamide, a polyester, a polybutylene, a PVC or an ABS. Various molecular weights of the polymers of this support film (backing layer) are contemplated within the scope of the invention. In some embodiments, the support film layer 5 can be a fiber reinforced plastic. Typically, the support film layer 5 is selected so that it is compatible with the polymer adhesive layer 3 and/or the plastic piping to which it will be applied.

In one aspect the third layer 7 is a release material and can be a film, a coating or a powder such as those known in the art. If a release coating or powder is used, the amount is minimal and does not substantially affect the physical properties of the polymer adhesive layer 3.

In another aspect the third layer 7 is a protective envelope barrier film, which can either be used singly against the polymer adhesive layer or to surround the entire adhesive-support film composite. The envelope barrier film may also be thought of as a packet, bag, or baggie, which may be open on one side. Thin envelope barrier films that are compatible with the other polymers of the MLP and the pipe can be incorporated in to the final MLP-pipe bond.

Figure 2:
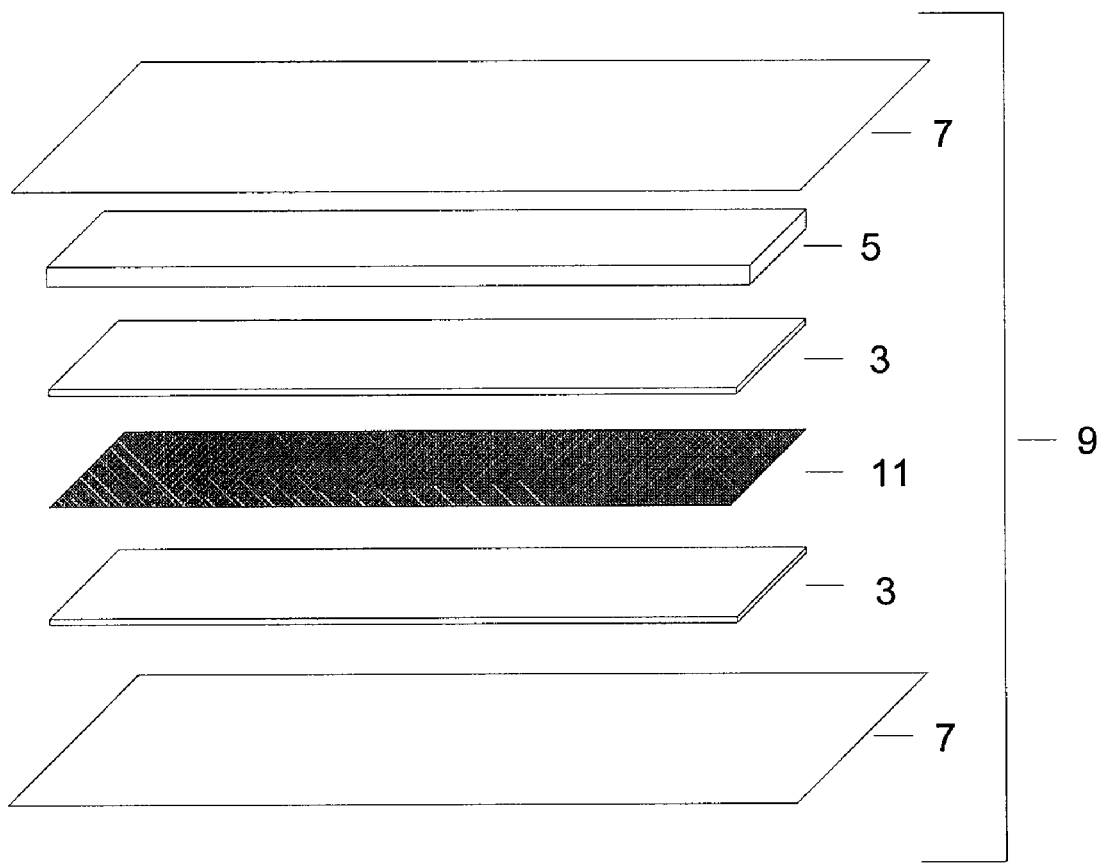
FIG. 2 depicts another aspect of the invention including a fiber or metal reinforced MLP.

FIG. 2 depicts an embodiment where the present invention pertains to a MLP 9 including at least two layers. The first layer is a polymer adhesive layer 3 that includes a reinforcing material 11, such as fibers, a cloth mesh, a metal mesh, a polymer mesh, or a wire grid. In one embodiment, 11 can be a wire mesh used as a heating element. The second layer 5, as in FIG. 1, is a support film or backing layer that can be intimately incorporated with the first polymer adhesive layer 3 upon application of heat. The MLP 9 can also include optional third and fourth layers 7. The second 5, third 7 and fourth 7 layers are as described in FIG. 1. For convenience, FIG. 2 depicts the reinforced polymer adhesive layer as including three separate portions, two 3's and 11. This is not to be construed as limiting, but illustrative only; the reinforcing material 11 can also be incorporated within the polymer adhesive layer (or layers) 3.

Suitable reinforcing fibers that can be included in the polymer adhesive layer 3 can be a polyethylene, a nylon, or a polyaramide fiber, such as Kevlar®. Choice of the reinforcing material 11 is such that the material does not dissolve in the polymer adhesive layer 3. For example, a high modulus polyethylene fiber can be used and is commercially available from Honeywell, USA and is known as Spectra® fiber. In certain embodiments, the fibers form a mat, mesh or a cloth. In certain embodiments, the reinforcing material 11 is comprised of metal wires or mesh.

The reinforcing material 11 can be incorporated into the polymer adhesive 3 by adding the reinforcing material 11 to the viscous gel material while the gel is curing, e.g., cooling.

Figure 3:
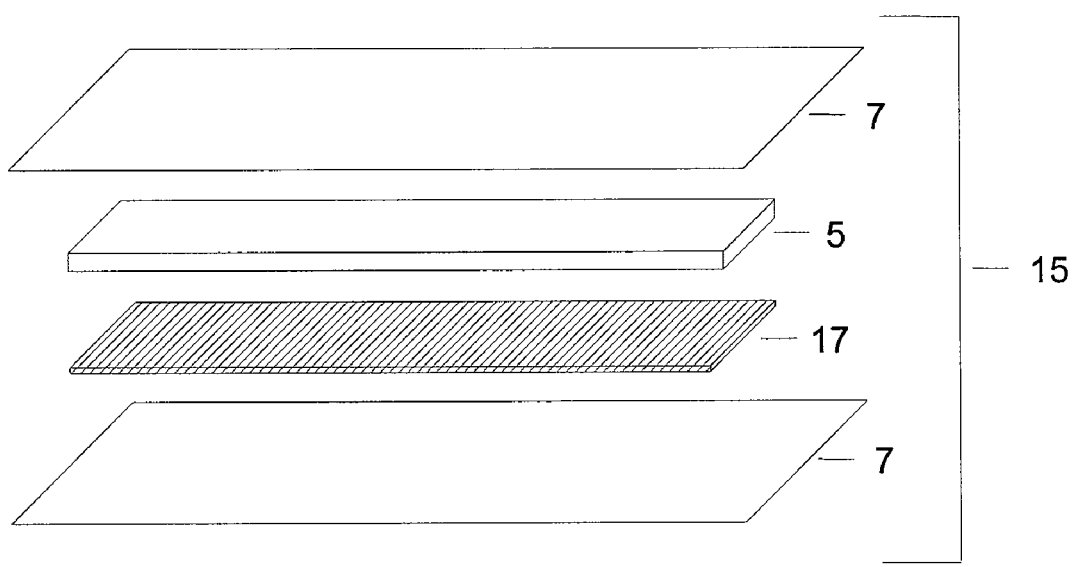
FIG. 3 depicts another aspect of the invention including an internally, electrically heated MLP.

FIG. 3 depicts another aspect of the present invention providing a MLP 15 that includes at least a first electrically heated layer 17 and second layer 5 with the optional third or fourth layers 7. In some embodiments, an electrically heated layer 17 can be used as combination reinforcing material and heat source. One such embodiment is a metal wire mesh 17, which can be used as a heated grid to fuse the support film/backing layer 5 to the pipe. When opposite edges of the wire mesh 17 are connected to an electrical power source the mesh 17 can be used as a resistance heated grid, which in turn can be used to bring the interface of the support film or backing layer 5 and the pipe up to their melting temperature. The combination of the melted surfaces and an applied squeezing force causes the two materials to bond and form one continuous layer with the metal mesh 17 being embedded in this bond. This heating method can be used with and without a polymer adhesive layer(s) 3 (not depicted).

Alternative internally heated MLP 15 embodiments include the use of a swollen film with wire mesh 17, where the wire mesh can be used to heat the swollen film to cure the support film 5—pipe bond interface. These resistance wires can either be attached to the surface of the film, for example by stitching, or be molded into the film layer, during the film manufacturing process. The polymer film choice would depend on the materials being bonded, for example polyethylene pipe connections or repairs would be paired with the appropriate polymer film such as low (LDPE), medium (MDPE), high density (HDPE), or ultrahigh molecular weight polyethylene (UHMWPE). Another option is to use a non-swollen film with the same type of resistance wires to melt and fuse the support film 5, the film 17, and the pipe material.

The MLP 1, 9 or 15 of FIGS. 1, 1A, 1B, 2 and 3 can be applied to a plastic pipe with a Clamp and Repair Tool as described in U.S. patent application Ser. No. 10/926,366, entitled "Clamp and Repair Tool" by Kenneth H. Green, filed on Aug. 25, 2004, the contents of which are incorporated herein by reference in their entirety. For example, the MLP 1 or 9 is placed in the jaws of the clamp and contacted with the plastic pipe surface. Pressure and heat are applied from the clamp to accomplish the connection or repair.

In an alternative application method a Clamp and Repair Tool as described in U.S. patent application Ser. No. 10/926, 366 can be used to hold and apply pressure to the above mentioned electrically heated MLPs 15 during the curing process.

The MLP 1, 9 or 15 provide an advantage over other adhesive systems. First, they are easy to handle since there is no free flowing solvent present. Second, if the MLP 1 or 9 includes a third and fourth layer 7 then the resultant barrier film envelope can be hermetically sealed so that outgassing of the solvent is not noticeable. Third, MLP 15 allows for the connection or repair to be conducted during low temperature conditions, where surface heating would not be adequate to provide the proper bond interface temperatures.

Example Preparation Methods

Gel

Polyethylene is weighed out to produce 6 wt %, 8 wt %, or 10 wt % (% polymer) gels. 50 mL of gel at a time are generally produced at a time, so 3, 4, or 5 grams of polyethylene are weighed out and placed in a 100 mL round-bottom flask respectively. The polyethylene can be low (LDPE), medium (MDPE), high density (HDPE), or ultrahigh molecular weight (UHMWPE).

Decalin is added to the flask to produce 50 grams of total gel. This is the weight of the polyethylene and decalin combined.

An oil bath is heated to, and maintained at, 145° C. The oil bath sits on top of a stir plate. A stir bar is placed in the round bottom flask and is stirred during the process.

The decalin/polyethylene mixture is maintained at 145° C. for 2 hours, and is then allowed to cool.

The gel is labeled and stored until it is time to make a gel film.

When it is time to make the gel film a small amount of gel is placed in a 50 mL round bottom flask and heated to 145° C.

Once the gel reaches temperature, it is poured onto a mold and pressed flat. The resulting gel film is allowed to cool for about 20 minutes.

A piece of polyethylene film to be used as an envelope is placed flat on the work area. The film used in the tests summarized below is commonly available LDPE "plastic wrap" that can be purchased at grocery stores. Other densities of polyethylene can be used. The piece of film should be large enough to completely cover the top and bottom of the preformed gel layer, plus enough margin to allow the edges to be sealed.

The preformed polyethylene gel is slid from the mold onto the plastic wrap. The plastic wrap is folded over, so the gel is completely covered with one layer of plastic wrap. The resulting barrier film envelope consists of a single layer of LDPE film upon which a layer of gel sits; with another layer of LDPE film covering the top of the gel. The LDPE film is pressed close around the three open edges.

Example Gel Lap-Shear Test Methods and Results

The prepared gel is placed between two layers of polyethylene substrate to be adhered. The substrate "sandwich" is placed in a frame to provide proper alignment during the curing process.

The frame and lap-shear samples are placed into a preheated press. Example test temperatures were between about 105 and about 120° C. The range of applied pressures was from about 5 to about 50 psi. The bond formation process takes a minimum of about 20 minutes at the set temperature. The lap-shear sample is allowed to cool to room temperature before testing. Representative examples are provided in Table 1.

Generally, HDPE substrates were bonded using the gel adhesive in a heated platen equipped Carver press with test sample thicknesses, pressures, and temperatures varied. The samples were prepared using a modified version of the ASTM standards D3163, D3165, and D5868. For the results shown in Table 1, the modified parameters were: overlap=0.5" square inches (1" wide×0.5"long), pull rate=0.5"/min, substrate thickness=3/16", 3/16" Backers are glued to the back of the substrate to keep samples in shear, as provided by the ASTM standard. The substrate sheets were cut into pieces for overlap shear tests according to ASTM standards. The substrate pieces that were used for the lap-shear tests were 4.5"× 1"×3/16". Spacers were 4"×1"×3/16", and doublers were 3.5"× 1"×3/16".

TABLE 1

| Substrate | Gel Polymer | Gel Solvent | Film Material | Gel Weight Percent | Patch Thickness | Cure Temperature (° C.) | Cure Time (hours) | Pressure (gauge) (PSIG) | Failure Mode | Comments | Shear Strength |
|---|---|---|---|---|---|---|---|---|---|---|---|
| HDPE | HDPE | Decalin | LDPE | 6 | 0.81 | 110 | 1.5 | 40 | Cohesive | | 512 |
| HDPE | HDPE | Decalin | LDPE | 6 | 0.81 | 110 | 1.5 | 40 | Cohesive | | 572 |
| HDPE | HDPE | Decalin | LDPE | 8 | 1 | 115 | 1.5 | 30 | Cohesive | | 812 |
| HDPE | HDPE | Decalin | LDPE | 8 | 1 | 115 | 1.5 | 30 | Cohesive | | 502 |
| HDPE | HDPE | Decalin | LDPE | 8 | 1 | 115 | 1.5 | 30 | Cohesive | | 492 |
| HDPE | HDPE | Decalin | LDPE | 6 | 1.19 | 120 | 1.5 | 20 | Cohesive | | 816 |
| HDPE | HDPE | Decalin | LDPE | 6 | 1.19 | 120 | 1.5 | 20 | Cohesive | | 744 |
| HDPE | HDPE | Decalin | LDPE | 6 | 1.19 | 120 | 1.5 | 20 | Cohesive | | 794 |
| HDPE | HDPE | Decalin | LDPE | 10 | 0.81 | 120 | 1.5 | 40 | Cohesive | | 853 |
| HDPE | HDPE | Decalin | LDPE | 10 | 0.81 | 120 | 1.5 | 40 | Cohesive | | 689 |
| HDPE | HDPE | Decalin | LDPE | 8 | 0.81 | 120 | 1.5 | 40 | Cohesive | | 629 |
| HDPE | HDPE | Decalin | LDPE | 8 | 0.81 | 110 | 1.5 | 40 | Cohesive | | 629 |
| HDPE | HDPE | Decalin | LDPE | 8 | 0.81 | 110 | 1.5 | 40 | Cohesive | | 502 |
| HDPE | HDPE | Decalin | LDPE | 8 | 0.66 | 115 | 1.5 | 30 | Cohesive | | 527 |
| HDPE | HDPE | Decalin | LDPE | 8 | 0.66 | 115 | 1.5 | 30 | Cohesive | | 520 |

TABLE 1-continued

| Substrate | Gel Polymer | Gel Solvent | Film Material | Gel Weight Percent | Patch Thickness | Cure Temperature (° C.) | Cure Time (hours) | Pressure (gauge) (PSIG) | Failure Mode | Comments | Shear Strength |
|---|---|---|---|---|---|---|---|---|---|---|---|
| HDPE | HDPE | Decalin | LDPE | 10 | 1.19 | 110 | 1.5 | 20 | Cohesive | | 463 |
| HDPE | HDPE | Decalin | LDPE | 10 | 1.19 | 110 | 1.5 | 20 | Cohesive | | 323 |
| HDPE | HDPE | Decalin | LDPE | 10 | 0.81 | 120 | 1.5 | 20 | Cohesive | | 593 |
| HDPE | HDPE | Decalin | LDPE | 10 | 0.81 | 120 | 1.5 | 20 | Cohesive | | 566 |
| HDPE | HDPE | Decalin | LDPE | 10 | 1.19 | 110 | 1.5 | 40 | Cohesive | | 388 |
| HDPE | HDPE | Decalin | LDPE | 10 | 1.19 | 110 | 1.5 | 40 | Cohesive | | 489 |
| HDPE | HDPE | Decalin | LDPE | 8 | 1 | 115 | 1.5 | 30 | Cohesive | | 447 |
| HDPE | HDPE | Decalin | LDPE | 8 | 1 | 115 | 1.5 | 30 | Cohesive | | 541 |
| HDPE | HDPE | Decalin | LDPE | 8 | 1.34 | 115 | 1.5 | 30 | Cohesive | | 470 |
| HDPE | HDPE | Decalin | LDPE | 8 | 1.34 | 115 | 1.5 | 30 | Cohesive | | 527 |
| HDPE | HDPE | Decalin | LDPE | 8 | 1 | 115 | 1.5 | 46.8 | Cohesive | | 554 |
| HDPE | HDPE | Decalin | LDPE | 8 | 1 | 115 | 1.5 | 46.8 | Cohesive | | 425 |
| HDPE | HDPE | Decalin | LDPE | 6 | 0.81 | 110 | 1.5 | 20 | Cohesive | | 551 |
| HDPE | HDPE | Decalin | LDPE | 6 | 0.81 | 110 | 1.5 | 20 | Cohesive | | 503 |
| HDPE | HDPE | Decalin | LDPE | 6 | 1.19 | 120 | 1.5 | 40 | Cohesive | | 642 |
| HDPE | HDPE | Decalin | LDPE | 6 | 1.19 | 120 | 1.5 | 40 | Cohesive | | 702 |
| HDPE | HDPE | Decalin | LDPE | 8 | 1 | 123 | 1.5 | 30 | Cohesive | | 672 |
| HDPE | HDPE | Decalin | LDPE | 8 | 1 | 123 | 1.5 | 30 | Cohesive | | 698 |
| HDPE | HDPE | Decalin | LDPE | 8 | 1 | 106 | 1.5 | 30 | Cohesive | | 324 |
| HDPE | HDPE | Decalin | LDPE | 8 | 1 | 106 | 1.5 | 30 | Cohesive | | 314 |
| HDPE | HDPE | Decalin | LDPE | 11.4 | 1 | 115 | 1.5 | 30 | Cohesive | | 606 |
| HDPE | HDPE | Decalin | LDPE | 11.4 | 1 | 115 | 1.5 | 30 | Cohesive | | 674 |
| HDPE | HDPE | Decalin | LDPE | 4.6 | 1 | 115 | 1.5 | 30 | Cohesive | | 641 |
| HDPE | HDPE | Decalin | LDPE | 6 | 0.81 | 115 | 1.5 | 20 | Adhesive/Cohesive | Not enough gel | 474 |
| HDPE | HDPE | Decalin | LDPE | 8 | 0.81 | 115 | 1.5 | 20 | Cohesive | | 783 |
| HDPE | HDPE | Decalin | LDPE | 10 | 0.81 | 115 | 1.5 | 40 | Cohesive | | 759 |
| HDPE | HDPE | Decalin | LDPE | 6 | 0.81 | 115 | 1.5 | 40 | Cohesive | | 678 |
| HDPE | HDPE | Decalin | LDPE | 8 | 0.81 | 115 | 1.5 | 40 | Cohesive | | 631 |
| HDPE | HDPE | Decalin | LDPE | 8 | 1 | 120 | 1.5 | 30 | Cohesive | aged 1 week | 728 |
| HDPE | HDPE | Decalin | LDPE | 8 | 1 | 120 | 1.5 | 30 | Cohesive | aged 1 week | 638 |
| HDPE | HDPE | Decalin | LDPE | 8 | 1 | 120 | 1.5 | 30 | Cohesive | aged 2 weeks | 680 |
| HDPE | HDPE | Decalin | LDPE | 8 | 1 | 120 | 1.5 | 30 | Cohesive | aged 2 weeks | 669 |
| HDPE | HDPE | Decalin | LDPE | 8 | 1 | 120 | 1.5 | 30 | Cohesive | aged 4 weeks | 641 |
| HDPE | HDPE | Decalin | LDPE | 8 | 1 | 120 | 1.5 | 30 | Cohesive | aged 4 weeks | 629 |
| HDPE | HDPE | Decalin | LDPE (0.04") | 6 | 0.81 | 115 | 1.5 | 20 | Cohesive | | 725 |

HDPE = High density polyethylene (e.g., 3/16" HDPE sheeting by McMaster Carr.)
LDPE = Low density polyethylene (e.g., a Fred Meyer brand plastic wrap.)
Cure temperature is in degrees Centigrade.
Cure Time is in hours.
Pressure refers to the gauge pressure on the Carver Press during cure.
"Failure Mode" is intended to encompass two basic failure modes recognized in adhesion science: adhesive failure, which means that the failure occurred in the boundary between the adhesive and the substrate, and cohesive failure, which means that the failure occurred either entirely in the substrate or entirely in the adhesive. The failures occurred entirely in the adhesive (except for the one sample without enough gel, in which the failure was both cohesive and adhesive).
Shear strength was determined using one of ASTM D3163, D3165, and D5868.

Example Preparation Methods

Polyethylene Swollen Film

A glass container/s containing decalin is inserted into the holding rack of the oil bath. The oil bath temperature is set to 101 to 105° C. (the temperature varies with the polyethylene film material) and the bath is allowed to equilibrate for about 1 hour. If the bath is already hot, but the decalin containers are not, at least 30 minutes is allowed for the decalin in these containers to reach the bath's set point temperature. The hot decalin temperature in each container is measured prior to the start of each batch of film samples.

A piece of film of desired size is cut (the film samples will swell 50-60% in all directions). The polyethylene can be low (LDPE), medium (MDPE), high density (HDPE), or ultra-high molecular weight (UHMWPE).

The film is placed into the hot glass decalin container, making sure the film is fully submerged into the hot decalin. The hot decalin temperature in each container is measured and documented prior to the start of each batch of film samples.

The film is allowed to swell for the desired time period (a baseline of 40 minutes for 20 wt % using 0.020" UHMWPE film). Weight percent is based on polymer content.

Once the desired swelling time is reached, the film is removed from the hot decalin with tweezers and plunged directly into a bottle of clean decalin that was kept in the freezer. The freezer bottle (with sample) is placed back into the freezer for at least 5 minutes.

Using tweezers, the chilled film sample is removed from the freezer bottle and placed into a closeable glass container or folded into LDPE or aluminum foil envelope and labeled.

Example Polyethylene Swollen Film Shear Test Methods and Results

The prepared swollen film is placed between two layers of polyethylene substrate to be adhered. The substrate "sandwich" is placed in a frame to provide proper alignment during the curing process.

The frame and lap-shear samples are placed into a preheated press. In order to simulate field conditions some lap-shear samples are made without preheating the press platens. Example test temperatures were between 110 and 120° C. The range of applied pressures was 5 to 50 psi. The bond formation process takes a minimum of about 20 minutes at the set temperature. The lap-shear sample is allowed to cool to room temperature before testing. Representative examples are provided in Table 2.

Generally, HDPE substrates were bonded using the swollen film adhesive in a heated platen equipped Carver press with test sample thicknesses, pressures, and temperatures varied. The samples were prepared using a modified version of the ASTM standards D3163, D3165, and D5868. For the results shown in Table 2, the modified parameters were: overlap=0.5 square inches (1" wide×0.5" long), pull rate=1"/min, substrate thickness=3/8". The substrate sheets were cut into pieces for overlap shear tests according to ASTM standards. The substrate pieces that were used for the lap-shear tests were 4"×1"×3/8".

TABLE 2

| Substrate | Swollen Film | Film Solvent | Film Material | Film Weight Percent | Cure Temperature (° C.) | Cure Time (hours) | Pressure (gauge) (PSIG) | Failure Mode | Comments | Shear Strength |
|---|---|---|---|---|---|---|---|---|---|---|
| HDPE | UHMWPE | Decalin | none | 60 | 121 | 90 | 20 | Adhesive | | 650 |
| HDPE | UHMWPE | Decalin | none | 60 | 121 | 90 | 20 | Adhesive | | 675 |
| HDPE | UHMWPE | Decalin | none | 60 | 121 | 90 | 20 | Adhesive | | 450 |
| HDPE | UHMWPE | Decalin | none | 40 | 121 | 90 | 20 | A-C | | 890 |
| HDPE | UHMWPE | Decalin | none | 40 | 121 | 90 | 20 | A-C | | 820 |
| HDPE | UHMWPE | Decalin | none | 40 | 121 | 90 | 20 | A-C | | 680 |
| HDPE | UHMWPE | Decalin | none | 20 | 121 | 90 | 20 | Cohesive | | 1300 |
| HDPE | UHMWPE | Decalin | none | 20 | 121 | 90 | 20 | Cohesive | | 1520 |
| HDPE | UHMWPE | Decalin | none | 20 | 121 | 90 | 20 | Cohesive | | 1280 |
| HDPE | HDPE | Decalin | none | 75 | 121 | 90 | 20 | Adhesive | Pretest fail | 0 |
| HDPE | HDPE | Decalin | none | 75 | 121 | 90 | 20 | Adhesive | | 375 |
| HDPE | HDPE | Decalin | none | 75 | 121 | 90 | 20 | Adhesive | | 440 |
| HDPE | HDPE | Decalin | none | 60 | 121 | 90 | 20 | Adhesive | | 430 |
| HDPE | HDPE | Decalin | none | 60 | 121 | 90 | 20 | Adhesive | | 460 |
| HDPE | HDPE | Decalin | none | 60 | 121 | 90 | 20 | Cohesive | | 600 |
| HDPE | HDPE | Decalin | none | 40 | 121 | 90 | 20 | A-C | | 860 |
| HDPE | HDPE | Decalin | none | 40 | 121 | 90 | 20 | A-C | | 960 |
| HDPE | HDPE | Decalin | none | 40 | 121 | 90 | 20 | A-C | | 780 |
| HDPE | HDPE | Decalin | none | 20 | 121 | 90 | 20 | Cohesive | | 1240 |
| HDPE | HDPE | Decalin | none | 20 | 121 | 90 | 20 | Cohesive | | 1390 |
| HDPE | HDPE | Decalin | none | 20 | 121 | 90 | 20 | Cohesive | | 1240 |
| HDPE | HDPE | Decalin | none | 30 | 121 | 90 | 20 | Adhesive | | 500 |
| HDPE | HDPE | Decalin | none | 30 | 121 | 90 | 20 | Adhesive | | 1020 |
| HDPE | HDPE | Decalin | none | 30 | 121 | 90 | 20 | Adhesive | | 550 |

Although the present invention has been described with reference to preferred embodiments, persons skilled in the art will recognize that changes may be made in form and detail without departing from the spirit and scope of the invention.

What is claimed is:

1. A multi-layered patch comprising:
    a first layer and a second layer, wherein said first layer is a polymer gel or a swollen polymer film and contains a reinforcement mesh, and said second layer is a polymer support film and becomes intimately incorporated with said first layer upon application of heat;
    a third layer in contact with said polymer gel or swollen polymer film, wherein said third layer becomes intimately incorporated with said polymer gel or swollen polymer film upon application of heat; and
    wherein said second and third layers are sealed together to form an envelope.

2. The multi-layered patch of claim 1, wherein the reinforcement mesh comprises a wire mesh configured such that upon heating of said wire mesh said support film melts about said wire mesh.

3. The multi-layered patch of claim 1, wherein said reinforcement mesh comprises fibers of polyethylene, nylon, or polyaramide.

4. The multi-layered patch of claim 1 wherein the third layer is in contact with said support film and/or said reinforcement mesh.

5. The multi-layered patch of claim 1, wherein said third layer is a film comprising a polymer.

6. The multi-layered patch of claim 5, wherein said third layer comprises a release material or a barrier layer.

* * * * *